(12) United States Patent
Fellenstein et al.

(10) Patent No.: US 8,234,677 B2
(45) Date of Patent: *Jul. 31, 2012

(54) METHOD AND SYSTEM FOR SELECTING AND BROADCASTING AUDIO/VIDEO CONTENT BASED ON LOCATION

(75) Inventors: Craig William Fellenstein, Brookfield, CT (US); Steven Van Jackson, Yardley, PA (US)

(73) Assignee: International Business Machines Corporation, Armonk, NY (US)

( * ) Notice: Subject to any disclaimer, the term of this patent is extended or adjusted under 35 U.S.C. 154(b) by 925 days.

This patent is subject to a terminal disclaimer.

(21) Appl. No.: 11/849,435

(22) Filed: Sep. 4, 2007

(65) Prior Publication Data

US 2009/0064241 A1     Mar. 5, 2009

(51) Int. Cl.
*H04N 7/10*  (2006.01)
*H04N 5/445* (2011.01)
*H04N 7/18*  (2006.01)
*G08G 1/123* (2006.01)

(52) U.S. Cl. .......... 725/74; 725/35; 725/61; 725/78; 340/988; 340/995.14; 340/995.24; 340/995.27

(58) Field of Classification Search .......... 725/35, 725/60, 61, 78, 81; 340/988, 995.14, 995.24, 340/995.27
See application file for complete search history.

(56) References Cited

U.S. PATENT DOCUMENTS

| | | | |
|---|---|---|---|
| 6,199,045 B1 | 3/2001 | Giniger et al. | |
| 6,205,399 B1 | 3/2001 | Ogino et al. | |
| 6,329,908 B1 | 12/2001 | Frecska | |
| 6,385,533 B1 | 5/2002 | Halt et al. | |
| 6,801,779 B1 | 10/2004 | Liebenow | |
| 6,845,338 B1 | 1/2005 | Willins et al. | |
| 7,613,630 B2 * | 11/2009 | Wolinsky et al. | 348/584 |
| 2003/0011477 A1 * | 1/2003 | Clapper | 340/573.1 |
| 2007/0219708 A1 * | 9/2007 | Brasche et al. | 701/207 |
| 2008/0042840 A1 * | 2/2008 | Christopher | 340/572.1 |
| 2008/0309508 A1 * | 12/2008 | Harmon | 340/686.1 |
| 2009/0058650 A1 * | 3/2009 | Fellenstein et al. | 340/572.1 |

* cited by examiner

*Primary Examiner* — Joseph P Hirl
*Assistant Examiner* — Kyu Chae
(74) *Attorney, Agent, or Firm* — Schmeiser, Olsen & Watts; William E. Schiesser

(57) ABSTRACT

A selection method and system. The method comprises receiving by a tracking apparatus data comprising audio/video data segments with associated tracking data segments. The audio/video data segments and the associated tracking data segments are associated with a plurality of locations. The tracking apparatus is moved within a specified proximity of a first location of the locations. The tracking apparatus senses the first location. The tracking apparatus retrieves a first audio/video data segment of the audio/video data segments associated with the first location. The retrieving is based on a first tracking data segment of the associated tracking data segments associated with the first audio/video data segment. The tracking apparatus broadcasts a specified portion of the first audio/video data segment. The specified portion is dependent on a specified condition of the tracking apparatus.

27 Claims, 7 Drawing Sheets

METHOD AND SYSTEM FOR SELECTING AND BROADCASTING AUDIO/VIDEO CONTENT BASED ON LOCATION

FIELD OF THE INVENTION

The present invention relates to a method and associated system for selecting and broadcasting audio and or video content based on a location.

BACKGROUND OF THE INVENTION

Assigning appropriate data files to associated objects so that the objects are appropriately defined is typically unreliable. Using the data files to describe the associated objects may not represent an accurate description. Additionally, the data files may not fully describe the associated objects. Accordingly, there exists a need in the art to overcome the deficiencies and limitations described herein above.

SUMMARY OF THE INVENTION

The present invention provides a method, comprising:

receiving, by a tracking apparatus, data, said data comprising audio/video data segments with associated tracking data segments, said audio/video data segments and said associated tracking data segments associated with a plurality of locations, each audio/video data segment of said audio/video data segments and each associated tracking data segment of said tracking data segments associated with a different location from said plurality of locations, each said location at a different geographical area;

moving said tracking apparatus within a specified proximity of a first location of said locations;

sensing, by said tracking apparatus, said first location of said locations;

retrieving, by said tracking apparatus, a first audio/video data segment of said audio/video data segments associated with said first location, said retrieving based on a first tracking data segment of said associated tracking data segments associated with said first audio/video data segment; and broadcasting, by said tracking apparatus, a specified portion of said first audio/video data segment, said specified portion dependent on a specified condition of said tracking apparatus.

The present invention provides a tracking apparatus comprising a processor coupled to a computer-readable memory unit, said memory unit comprising data and instructions that when executed by the processor implement a tracking method, said data comprising audio/video data segments with associated tracking data segments, said audio/video data segments and said associated tracking data segments associated with a plurality of locations, each audio/video data segment of said audio/video data segments and each associated tracking data segment of said tracking data segments associated with a different location from said plurality of locations, each said location at a different geographical area, said method comprising:

receiving, by said tracking apparatus, data;

moving, said tracking apparatus within a specified proximity of a first location of said locations;

sensing, by said tracking apparatus, said first location of said locations;

retrieving, by said tracking apparatus, a first audio/video data segment of said audio/video data segments associated with said first location, said retrieving based on a first tracking data segment of said associated tracking data segments associated with said first audio/video data segment; and broadcasting, by said tracking apparatus, a specified portion of said first audio/video data segment, said specified portion dependent on a specified condition of said tracking apparatus.

The present invention provides a computer program product, comprising a computer usable medium comprising data and a computer readable program code embodied therein, said data comprising audio/video data segments with associated tracking data segments, said audio/video data segments and said associated tracking data segments associated with a plurality of locations, each audio/video data segment of said audio/video data segments and each associated tracking data segment of said tracking data segments associated with a different location from said plurality of locations, each said location at a different geographical area, said computer readable program code comprising an algorithm adapted to implement a tracking method within a tracking apparatus, said method comprising:

receiving, by said tracking apparatus, data;

moving, said tracking apparatus within a specified proximity of a first location of said locations;

sensing, by said tracking apparatus, said first location of said locations;

retrieving, by said tracking apparatus, a first audio/video data segment of said audio/video data segments associated with said first location, said retrieving based on a first tracking data segment of said associated tracking data segments associated with said first audio/video data segment; and broadcasting, by said tracking apparatus, a specified portion of said first audio/video data segment, said specified portion dependent on a specified condition of said tracking apparatus.

The present invention advantageously provides simple method and associated system capable of assigning appropriate data files to associated objects.

DETAILED DESCRIPTION OF THE INVENTION

Figure 1:
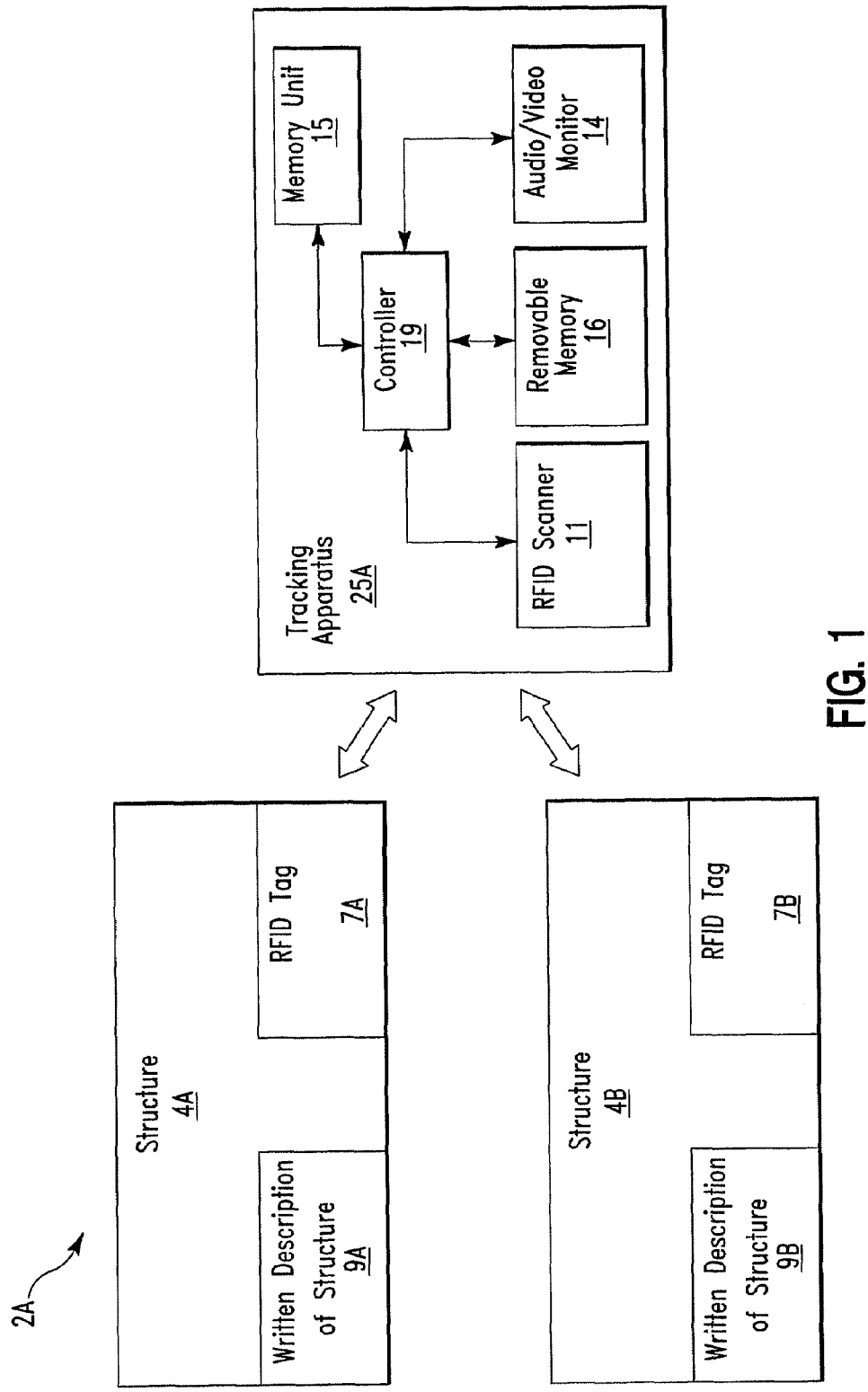
FIG. 1 illustrates a block diagram view of a system comprising a tracking apparatus 25A and structures, in accordance with embodiments of the present invention.

FIG. 1 illustrates a block diagram view of a system 2A comprising a tracking apparatus 25A and structures 4A and 4B, in accordance with embodiments of the present invention. System 2A allows a user in possession of tracking apparatus 25A to approach structure 4A and/or 4B and receive a broadcast comprising an associated (i.e., associated to structure 4A and/or 4B) portion of audio and/or video data describing the associated structure 4A and/or 4B. For example, a user touring a museum will carry the tracking apparatus 25A and as the user approaches each exhibit (e.g., work of art, sculpture, etc), the tracking apparatus 25A will detect each exhibit and broadcast an associated portion of audio and/or video data describing the exhibit. The portion of audio and/or video data broadcasted for the user may be dependent on a specified distance that the user is from structure 4A and/or 4B. For example, if the user is 5 feet away from the exhibit (e.g., structure 4A), the portion of the audio and/or video data broadcasted for the user may comprise a small abbreviated portion of the audio and/or video data associated with the exhibit (e.g., structure 4A) as it is assumed that the user is moving away from the structure. In contrast, if the user is 2 feet away from the exhibit (e.g., structure 4A), the portion of the audio and/or video data broadcasted for the user may comprise an entire portion of the audio and/or video data associated with the exhibit (e.g., structure 4A) as it is assumed that the user is moving towards the structure. Alternatively, the portion of audio and/or video data broadcasted for the user may be dependent on a specified amount of time that the user is detected at structure 4A and/or 4B.

Structure 4A comprises a radio frequency identification (RFID) tag 7A and optionally a written description 9A of structure 4A. Structure 4B comprises an RFID tag 7B and optionally a written description 9B of structure 4B. Structures 4A and 4B may comprise any type of structures on display including, inter alia, exhibits at a museum (e.g., work of art, sculpture, etc), etc. Tracking apparatus 25A comprises a controller 19, a memory unit 15, an RFID scanner, removable memory or media 16, and an audio/video monitor 14. Controller 19 in combination with any controlling software on memory unit 15 controls all functionality of tracking apparatus 25A. Audio/video monitor 14 may comprise any type of audio and/or video monitor including, inter alia, an amplifier and speakers, a video monitor (liquid crystal (LCD), Plasma, cathode ray tube (CRT), etc), or any combination thereof. Removable media 16 comprises audio and/or video data describing each of structures 4A and 4B. Additionally, removable media 16 comprises identification data describing RFID tags 7A and 7B. Removable media 16 may comprise any type of removable media including, inter alia, a read only memory (ROM) media (e.g., compact disc (CD) ROM, digital versatile disc (DVD) ROM, etc), a flash memory media, etc. The identification data describing RFID tags 7A and 7B may comprise any type of identification data including, inter alia, a serial number for each of RFID tags 7A and 7B. The identification data describing RFID tag 7A is associated with audio and/or video data describing structure 4A. The identification data describing RFID tag 7B is associated with audio and/or video data describing structure 4B.

When a user enables tracking apparatus 25A, tracking apparatus 25A continuously scans surroundings in order to locate RFID tags. As the user possessing (e.g., carrying) tracking apparatus 25A approaches structure 4A, RFID scanner 11 scans and senses RFID tag 7A and compares identification data from RFID tag 7A (e.g., a serial number) to stored identification information on removable media 16. When a match is located an associated portion of audio and/or video data stored on removable media 16 is broadcast for the user via audio/video monitor 14. A size of the associated portion of audio and/or video data broadcasted for the user is dependent on a specified distance that the user is from structure 4A or a specified time that the user is within range of structure 4A. Specified distances from structure 4A are preprogrammed and associated with audio/video data associated with structure 4A so that specified portions of the audio/video data may be broadcasted for the user dependent on distances from structure 4A. RFID scanner 11 may determine a distance by a strength of a signal received from RFID tag 7A. Specified time periods that the user is within range of structure 4A may also be preprogrammed and associated with audio/video data associated with structure 4A. Likewise, as the user possessing (e.g., carrying) tracking apparatus 25A approaches structure 4B, RFID scanner 11 senses RFID tag 7B and compares identification data from RFID tag 7B (e.g., a serial number) to stored identification information on removable media 16. When a match is located an associated portion of audio and/or video data stored on removable media 16 is broadcast for the user via audio/video monitor 14. A size of the associated portion of audio and/or video data broadcasted for the user is dependent on a specified distance that the user is from structure 4B or a specified time that the user is within range of structure 4B. Specified distances from structure 4B are preprogrammed and associated with audio/video data associated with structure 4B so that specified portions of the audio/video data may be broadcasted for the user dependent on distances from structure 4B. RFID scanner 11 may determine a distance by a strength of a signal received from RFID tag 7B. Specified time periods that the user is within range of structure 4B may also be preprogrammed and associated with audio/video data associated with structure 4B.

Figure 2:
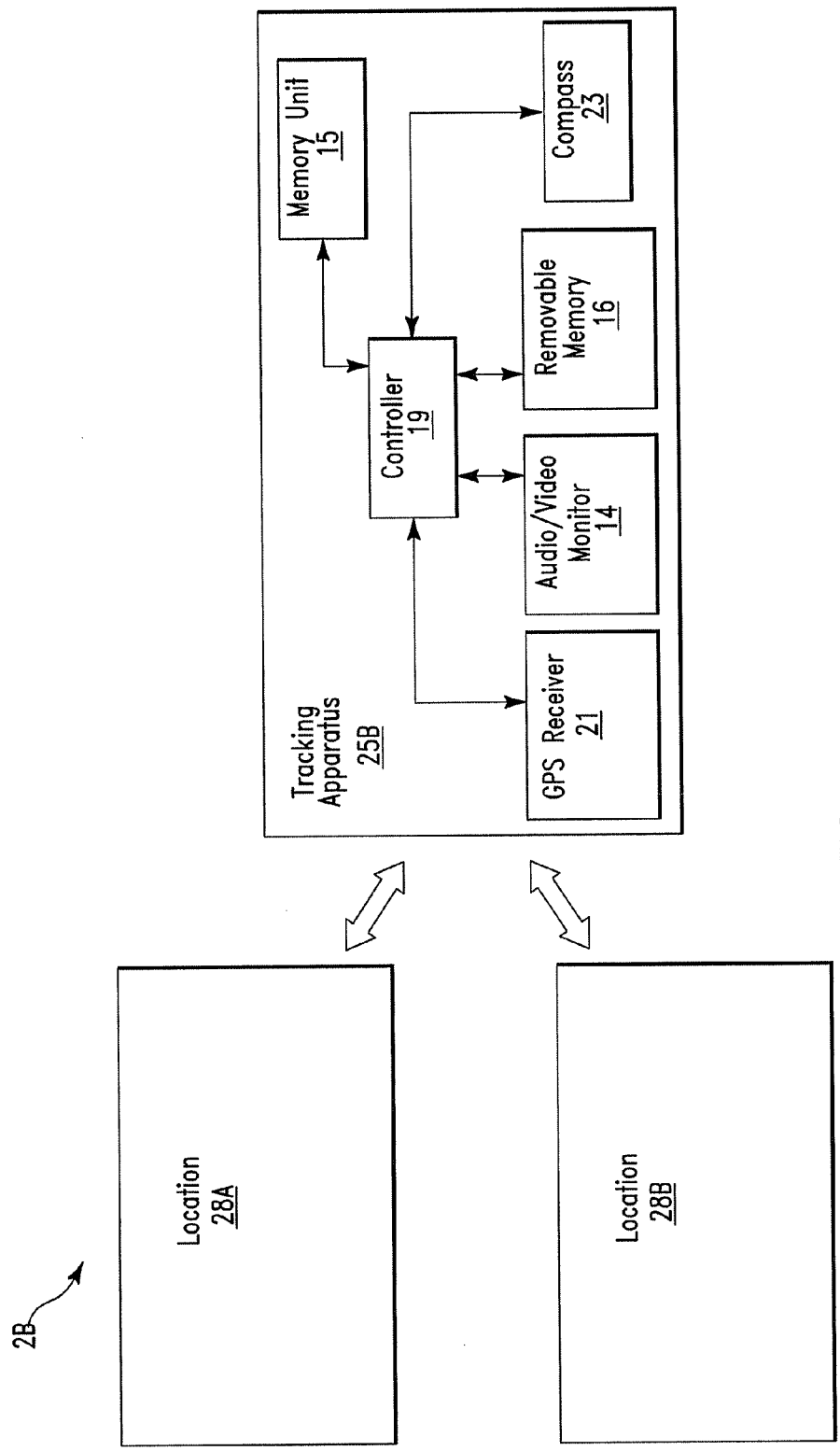
FIG. 2 illustrates a block diagram view of a system comprising a tracking apparatus and locations, in accordance with embodiments of the present invention.

FIG. 2 illustrates a block diagram view of a system 2B comprising a tracking apparatus 25B and locations 28A and 28B, in accordance with embodiments of the present invention. In contrast with tracking apparatus 25A of FIG. 1, a tracking apparatus 25B of FIG. 2 comprises a global positioning satellite (GPS) receiver 21 and a compass 23 instead of RFID scanner 11. Compass 23 may comprise a digital compass. System 2B allows a user in possession of tracking apparatus 25B to approach locations 28A and 28B and receive a broadcast comprising an associated (i.e., associated to location 28A and/or 28B) portion of audio and/or video data describing the associated location 28A and/or 28B. For example, a user touring a national park will carry the tracking apparatus 25A and as the user approaches each of locations 28A and 28B (e.g., a mountain, a landmark, a river, etc), the tracking apparatus 25B will use GPS tracking data to detect each of locations 28A and 28B and broadcast an associated portion of audio and/or video data describing the locations 28A and 28B. The portion of audio and/or video data broadcasted for the user may be dependent on a specified distance that the user is from structure locations 28A and 28B, a speed of travel towards structure locations 28A and 28B, a direction that the user is facing with respect to locations 28A and 28B, an orientation that the user is facing with respect to the earth's magnetic poles. For example, if the user is moving quickly (e.g., user is driving an automobile at a highway speed of about 55 mph) towards location 28A, the portion of the audio and/or video data broadcasted for the user may comprise a small abbreviated portion of the audio and/or video data associated with location 28A as it is assumed that the user may not be within a viewing range of location 28A for very long. In contrast, if the user is moving slowly (e.g., user is walking) towards location 28A, the portion of the audio and/or video data broadcasted for the user may comprise an entire portion of the audio and/or video data associated with location 28A as it is assumed that the user will be within a viewing range of location 28A for a long enough time to receive the entire description for location 28A.

Tracking apparatus 25B comprises a controller 19, a memory unit 15, a GPS receiver 21, a compass 23, removable media 16, and an audio/video monitor 14. Controller 19 in combination with any controlling software on memory unit 15 controls all functionality of tracking apparatus 25B. Audio/video monitor 14 may comprise any type of audio and/or video monitor including, inter alia, an amplifier and speakers, a video monitor (LCD, Plasma, CRT, etc), or any combination thereof. Removable media 16 comprises audio and/or video data describing each of locations 28A and 28B. Additionally, removable media 16 comprises GPS trigger data describing a geographical location for locations 28A and 28B. Removable media 16 may comprise any type of removable media including, inter alia, a read only memory (ROM) media (e.g., CD-ROM, DVD-ROM, etc), a flash memory media, etc. The GPS trigger data describing location 28A is associated with audio and/or video data describing location 28A. The GPS trigger data describing location 28B is associated with audio and/or video data describing location 28B.

When a user enables tracking apparatus 25B, tracking apparatus 25B continuously monitors GPS trigger data from GPS receiver 21 in order to locate locations 28A and 28B. As the user possessing (e.g., carrying) tracking apparatus 25B approaches location 28A, a GPS receiver 21 senses it's position with respect to location 28A and an associated portion of audio and/or video data stored on removable media 16 is broadcast for the user via audio/video monitor 14. A size of the associated portion of audio and/or video data broadcasted for the user is dependent on a specified distance that the user is from location 28A, a speed of travel towards location 28A, a direction that the user is facing with respect to location 28A, or an orientation that the user is facing with respect to the earth's magnetic poles. The orientation that the user is facing with respect to the earth's magnetic poles is determined by compass 23. Each of the specified distances, speed of travel, and direction the user is facing with respect to location 28A is preprogrammed and associated with audio/video data associated with location 28A so that specified portions of the audio/video data may be broadcasted for the user. Likewise, as the user possessing (e.g., carrying) tracking apparatus 25B approaches location 28B, GPS receiver 21 senses it's position with respect location 28B and an associated portion of audio and/or video data stored on removable media 16 is broadcast for the user via audio/video monitor 14. A size of the associated portion of audio and/or video data broadcasted for the user is dependent on a specified distance that the user is from location 28B, a speed of travel towards location 28B, or a direction that the user is facing with respect to location 28B. The direction that the user is facing with respect to location 28B is determined by compass 23. Each of the Specified distances, speed of travel, and direction the user is facing with respect to location 28B is preprogrammed and associated with audio/video data associated with location 28B so that specified portions of the audio/video data may be broadcasted for the user.

Figure 3:
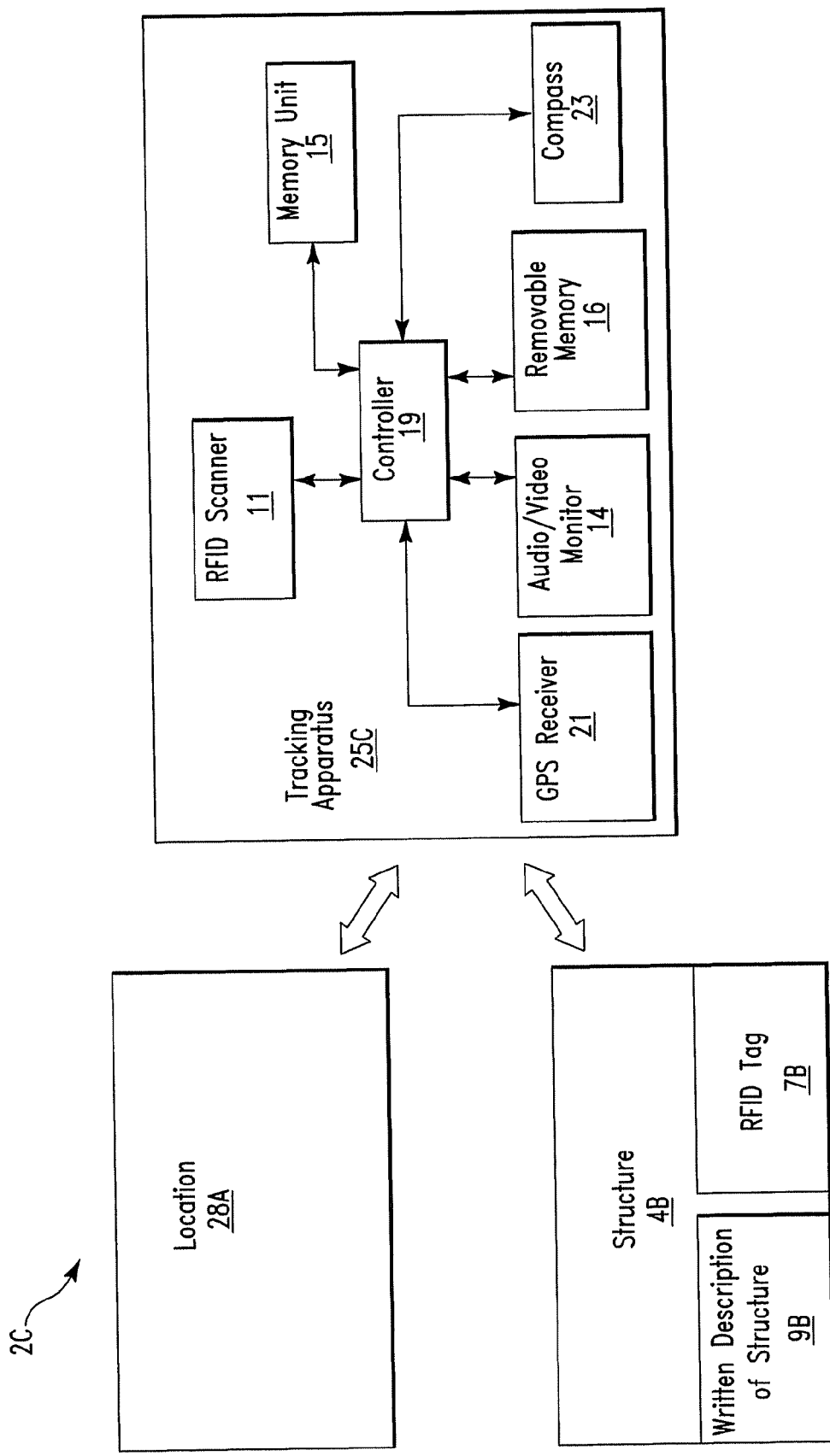
FIG. 3 illustrates a block diagram view of a system comprising an alternative tracking apparatus to the tracking apparatus of FIGS. 1 and 2, in accordance with embodiments of the present invention.

FIG. 3 illustrates a block diagram view of a system 2C comprising a tracking apparatus 25C, in accordance with embodiments of the present invention. Tracking apparatus 25C of FIG. 2 represents a combination of tracking apparatus 25A of FIG. 1 and 25B of FIG. 2. Tracking apparatus 25C comprises both a GPS receiver 21 and a RFID scanner 11. Tracking apparatus 25C enables a user to sense a GPS location for location 28A and broadcast an associated portion of audio/video data describing location 28A or sense RFID tag 7B for structure 4B and broadcast an associated portion of audio/video data describing structure 4B.

An example of implementation for tracking apparatus 25C is described as follows:

The Gettysburg National Military Park is run by the National Park Service (NPS). The park comprises both indoor and outdoor tourism-related activities and exhibits. In the example, the NPS has pre-recorded audio clips by official tour guides and has mapped the audio clips to RFID tag identifiers on indoor exhibits and GPS trigger data to outdoor exhibits. The NPS has stored the audio clips and associated RFID tag identifiers and GPS trigger data in CD files that are posted on their website. Family A planning to visit the Gettysburg National Military Park downloads a copy of the CD files from the web site and burns a CD for the trip. The CD is inserted in the tracking apparatus 25C and family A heads out for the park in their vehicle. As they approach the park, the tracking apparatus 25C will begin to play audio clips describing each outdoor exhibit (i.e., triggered by the GPS receiver). Family A will hear descriptions of the surroundings, and a historical review of the battles that occurred in the area. Highly produced audio clips may even include sounds of charging armies, riding horses, and guns and cannons. The amount of detail played back increases as they slow down the vehicle on country roads approaching each exhibit. Family A parks the vehicle, takes the tracking apparatus 25C and walks around the grounds of a battlefield in the park and listens to more descriptions about the events that transpired there. After walking the grounds of the battlefield, they head inside to hear more information about the life and times of the American 19th century. As they head inside the visitor's center, the person carrying the tracking apparatus 25C browses its menu system (i.e., via audio/video monitor) and turns on RFID scanner 11. As they walk around inside the visitor center, and view an indoor exhibit the tracking apparatus 25C looks up an RFID tag number (i.e., located in a flat file on removable media 16) for the indoor exhibit and begins playing the associated audio file. Therefore, in the aforementioned example, outdoor exhibits may trigger associated audio clip using GPS trigger data and indoor exhibits may trigger associated audio clips using RFID tag numbers.

Figure 4:
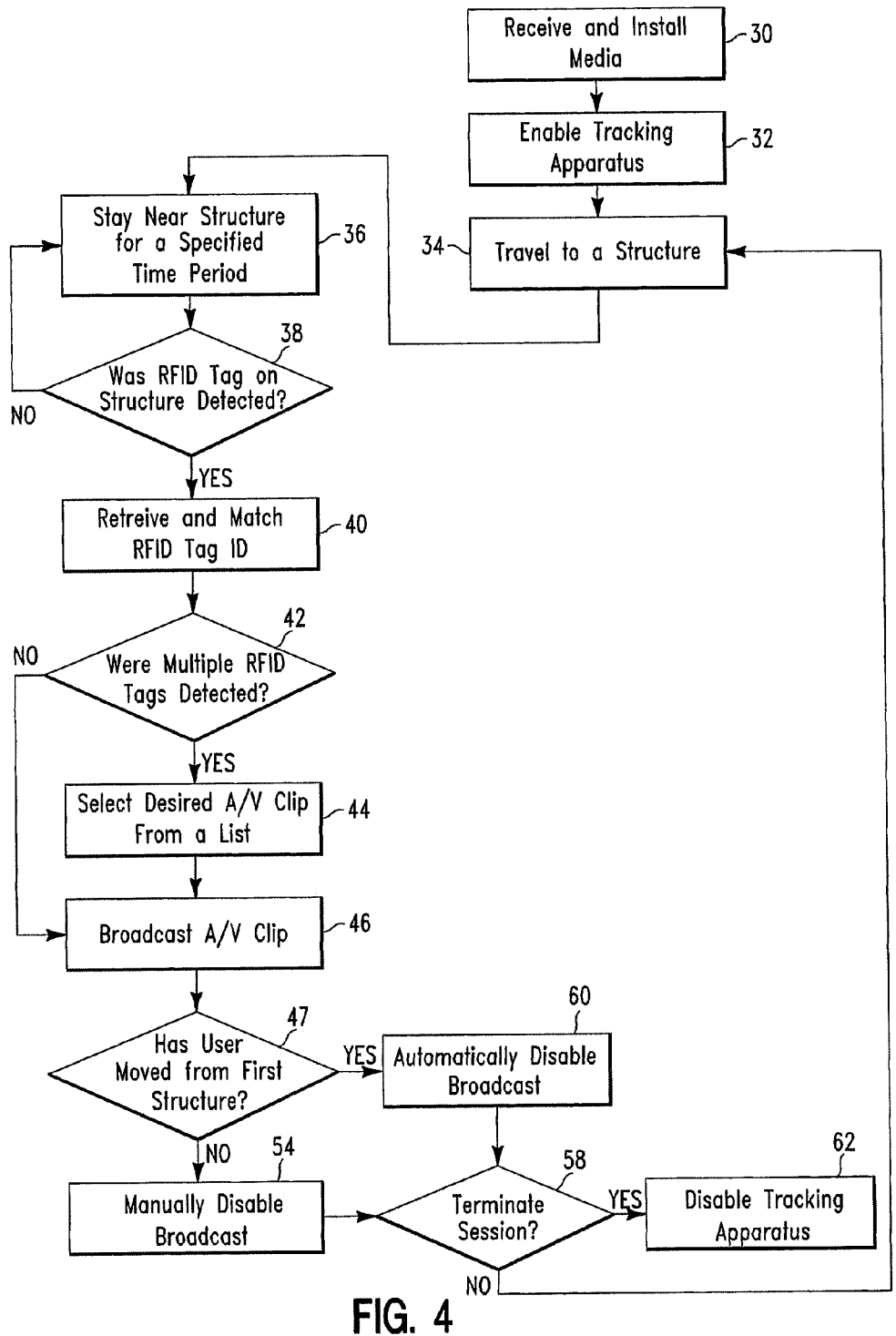
FIG. 4 is a flowchart illustrating an algorithm detailing an overall process used by the system of FIG. 1, in accordance with embodiments of the present invention.

FIG. 4 is a flowchart illustrating an algorithm detailing an overall process used by system 2A of FIG. 1, in accordance with embodiments of the present invention. In step 30, a user receives removable media 16 comprising RFID identifiers (i.e., serial numbers) for structures 4A and 4B and associated audio/video data and installs removable media in tracking apparatus 25A. RFID identifiers for structure 4A and 4B and associated audio/video data may be, inter alia, downloaded from a website, purchased at a store, etc. In step 32, tracking apparatus 25A is enabled. In step 34, the user travels to structure 4A. In step 36, the user stands nearby structure 4A. In step 38, it is determined if RFID tag 7A for structure 4A has been detected by tracking apparatus 25A. If in step 38 it is determined that RFID tag 7A for structure 4A has not been detected by tracking apparatus 25A, then step 38 is repeated. If in step 38, it is determined that RFID tag 7A for structure 4A has been detected by tracking apparatus 25A, then in step 40 an RFID tag number (e.g., a serial number) for RFID tag 7A is retrieved from removable media 16 and matched to RFID tag 7A. In step 42, it is determined if multiple RFID tags (i.e., RFID tag 7A and 7B) are detected. If in step 42, it is determined that multiple RFID tags (i.e., RFID tag 7A and 7B) are detected, then in step 44 a desired associated audio clip (i.e., associated with RFID tag 7A) is selected from a list displayed on audio/video monitor 14 and the desired associated audio clip is broadcasted for the user in step 46. If in step 42, it is determined that multiple RFID tags (i.e., RFID tag 7A and 7B) are not detected, then in step 46 the desired associated audio clip is broadcasted for the user. In step 47, it is determined if the user has moved out of range from structure 4A.

If in step 47, it is determined that the user has moved out of range from structure 4A, then in step 60 the broadcast is automatically disabled and in step 58 the user is asked if the session (i.e., tour of structures 4A and 4B) will be terminated. If in step 58, the user chooses to terminate the session, then in step 62 the tracking apparatus is disabled. If in step 58, the user chooses not to terminate the session, then step 34 is repeated to view another structure (e.g., structure 4B).

If in step 47, it is determined that the user has not moved out of range from structure 4A, then in step 54, the user may manually disable the broadcast. The user may temporarily disable the broadcast (e.g., pause the broadcast). Alternatively, the user may permanently disable the broadcast (e.g., stop the broadcast). If in step 58, the user chooses to terminate the session, then in step 62 the tracking apparatus is disabled. If in step 58, the user chooses not to terminate the session, then step 34 is repeated to view another structure (e.g., structure 4B).

Figure 5:
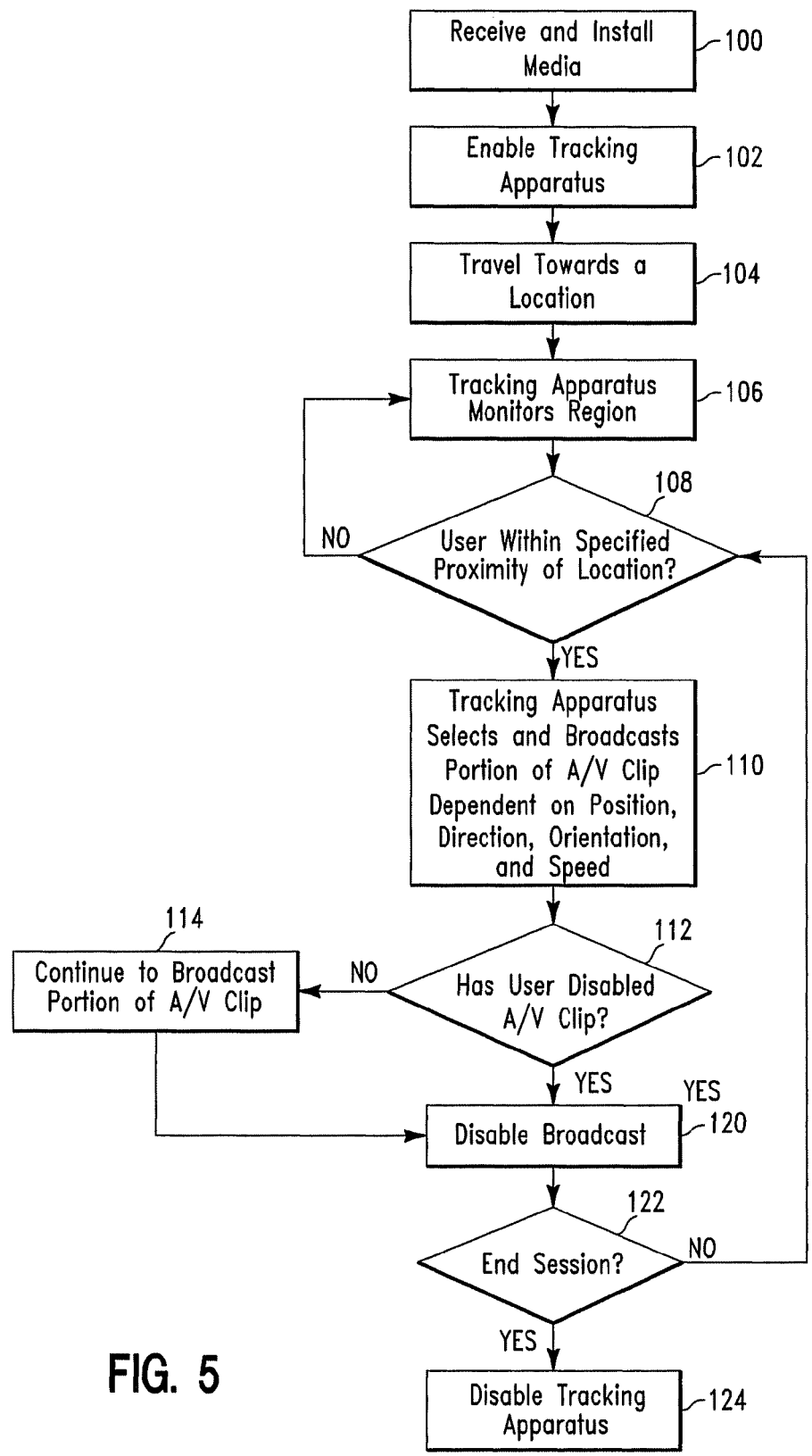
FIG. 5 is a flowchart illustrating an algorithm detailing an overall process used by the system of FIG. 2, in accordance with embodiments of the present invention.

FIG. 5 is a flowchart illustrating an algorithm detailing an overall process used by system 2B of FIG. 2, in accordance with embodiments of the present invention. In step 100, a user receives removable media 16 comprising GPS trigger data for locations 28A and 28B and associated audio/video data and installs removable media in tracking apparatus 25B. GPS trigger data for locations 28A and 28B and associated audio/video data may be, inter alia, downloaded from a website, purchased at a store, etc. In step 102, tracking apparatus 25B is enabled. In step 104, the user travels to location 28A. In step 106, tracking apparatus 25B monitors its current position, speed, direction of travel, and/or orientation with respect to the earth and its poles as reported by GPS receiver 21 and compass 23. In step 108, it is determined if the user is within a specified proximity of location 28A. If in step 108, it is determined that the user is not within a specified proximity of location 28A then step 106 is repeated. If in step 108, it is determined that the user is within a specified proximity of location 28A, then in step 110 tracking apparatus 25B selects and broadcasts a portion of an associated audio/video clip. A size of the portion of the associated audio/video clip is dependent on a position, direction, and speed of travel of the user with respect to location 28A. Alternatively, in step 110 tracking apparatus 25B may select and broadcast a portion of an associated audio/video clip for a location (not shown) that the user is orientated towards. An orientation for the user is determined by compass 23 with respect to the earth's magnetic poles. In step 112, it is determined if the user has disabled the A/V clip broadcast. The user may temporarily disable the broadcast (e.g., pause the broadcast). Alternatively, the user may permanently disable the broadcast (e.g., stop the broadcast).

If in step 112, it is determined that the user has not disabled the A/V clip broadcast, then in step 114 tracking device 25B continues to broadcast the A/V clip until the user disables the broadcast in step 120. Alternatively, if the user moves away from location 28A, tracking apparatus 25B may automatically disable the broadcast in step 120. In step 122 the user determines if the session should end. If in step 122, the user determines that the session should not end, then step 108 is repeated. If in step 122, the user determines that the session should end, then in step 124, tracking apparatus 25B is disabled.

If in step 112, it is determined that the user has disabled the A/V clip broadcast, then in step 120 the broadcast is disabled.

In step 122, the user determines if the session should end. If in step 122, the user determines that the session should not end, then step 108 is repeated. If in step 122, the user determines that the session should end, then in step 124, tracking apparatus 25B is disabled.

Figure 6:
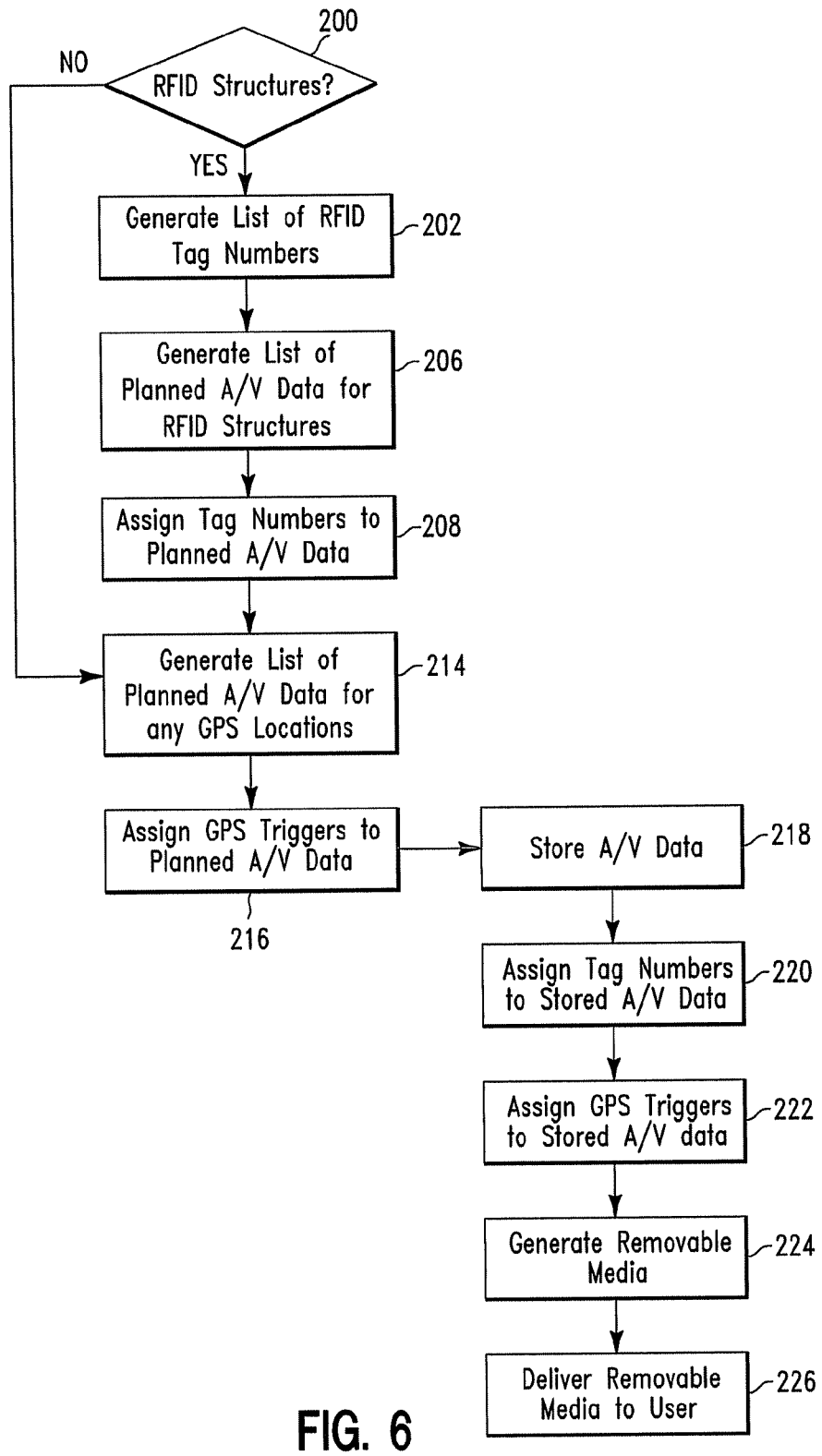
FIG. 6 is a flowchart illustrating an algorithm detailing an overall process for populating the removable media of FIGS. 1-3, in accordance with embodiments of the present invention.

FIG. 6 is a flowchart illustrating an algorithm detailing an overall process for populating removable media 16 of FIGS. 1-3, in accordance with embodiments of the present invention. The overall process described in the flowchart of FIG. 6 is performed by an entity or company producing removable media for describing structures 4A and 4B of FIG. 1 and locations 28A and 28B of FIG. 2. In step 200, the entity determines if RFID structures (e.g., structures 4A and 4B) are included in an exhibit. If in step 200, the entity determines that RFID structures are not included in the exhibit, then step 214 is performed as described, infra. If in step 200, the entity determines that RFID structures are included in the exhibit then in step 202, a list of RFID tag numbers (e.g., serial numbers for RFID tags 7A and 7B) is generated. In step 206, a list of planned A/V recordings or data for the RFID structures (e.g., for structures 4A and 4B) is generated. In step 208, the RFID tag numbers from the list generated in step 202 are assigned to associated planned A/V data from the list generated in step 206. In step 214, a list of planned A/V data for the GPS locations (e.g., for locations 28A and 28B) is generated. In step 216, the A/V data for each GPS location are assigned associated GPS trigger data. In step 218, all A/V data from the lists generated in steps 206 and 214 is retrieved and stored. In step 220, the RFID tag numbers from step 202 are assigned to associated stored A/V data. In step 222, the GPS trigger data from step 216 is assigned to associated stored A/V data. In step 226, removable media 16 is generated comprising A/V data and associated RFID tag numbers and GPS trigger data. For example, if removable media 16 is a compact disc then the compact disc may be generated or burned comprising the A/V data and associated RFID tag numbers and GPS trigger data. In step 226, removable media 16 is delivered to the user prior to touring structures 4A and 4B and locations 28A and 28B.

Figure 7:
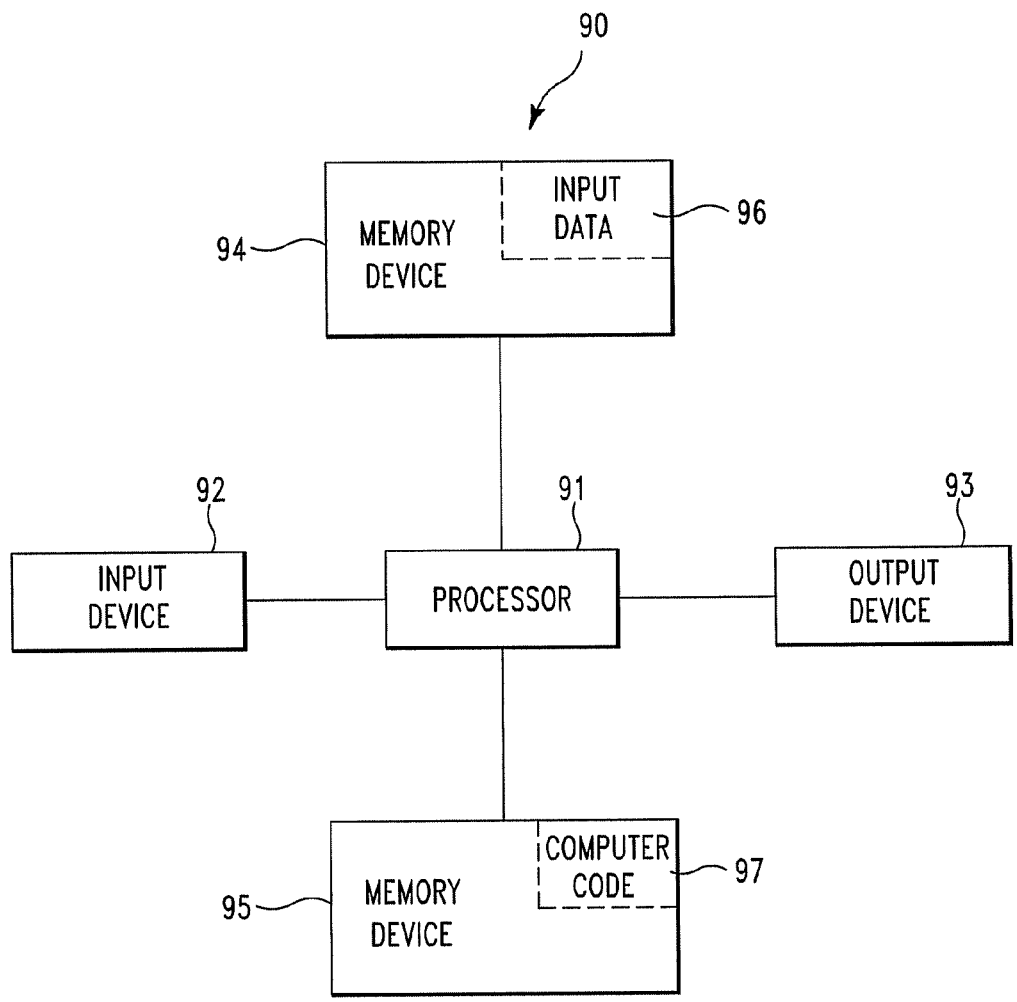
FIG. 7 illustrates a computer system used for implementing the tracking apparatuses of FIGS. 1-3, in accordance with embodiments of the present invention.

FIG. 7 illustrates a computer system 90 used for implementing tracking apparatuses 25A . . . 25C of FIGS. 1-3, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital versatile disc (DVD), a dynamic random access memory (DRAM), a read-only memory (ROM), etc. The memory device 95 includes a computer code 97. The computer code 97 includes an algorithm for implementing the processes of FIGS. 4 and 5. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithms of FIGS. 4 and 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
   receiving, by a tracking apparatus comprising a removable memory device and a digital compass, data, said data comprising audio/video data segments with associated tracking data segments, said audio/video data segments and said associated tracking data segments associated with a plurality of locations, each audio/video data segment of said audio/video data segments and each associated tracking data segment of said tracking data segments associated with a different location from said plurality of locations, each said location at a different geographical area;
   receiving, by said tracking apparatus, a plurality of preprogrammed specified distances from a first location of said locations;
   receiving, by said tracking apparatus, a plurality of preprogrammed specified time periods associated with said first location of said locations;
   storing, by said tracking apparatus within said removable memory device attached to said tracking apparatus, said data, said plurality of preprogrammed specified distances, and said plurality of preprogrammed specified time periods;
   moving said tracking apparatus within a specified proximity of said first location of said locations;
   sensing, by said tracking apparatus, said first location of said locations;
   retrieving, by said tracking apparatus, a first audio/video data segment of said audio/video data segments describing said first location, said retrieving based on a first tracking data segment of said associated tracking data segments associated with said first audio/video data segment;
   determining, by said tracking apparatus based on said plurality of preprogrammed specified distances and a signal strength received from a device at said first location, a specified distance that said tracking apparatus is from first location;
   determining, by said tracking apparatus based on said plurality of preprogrammed specified time periods, an amount of time that said tracking apparatus has been located within said specified proximity of said first location;
   determining, by said tracking apparatus, a specified speed of travel of said tracking apparatus towards said first location, wherein said specified speed of travel indicates that a user of said tracking apparatus is moving quickly towards said first location and that the user may not be within a first viewing range of the first location for a long time period;
   determining, by said tracking apparatus based on first orientation data supplied by said digital compass, a direction of said tracking apparatus with respect to said first location; and
   broadcasting, by said tracking apparatus, a specified portion of said first audio/video data segment, said specified portion dependent on said specified distance, said amount of time, said specified speed of travel, and said direction, said specified portion comprising a small abbreviated portion of said first audio/video data segment consistent with said first viewing range;
   determining, by said tracking apparatus based on said plurality of preprogrammed specified distances and a second signal strength received from a device at said first location, a second specified distance that said tracking apparatus is from first location;
   determining, by said tracking apparatus based on said plurality of preprogrammed specified time periods, an additional amount of time that said tracking apparatus has been located within said specified proximity of said first location;
   determining, by said tracking apparatus, a second specified speed of travel of said tracking apparatus towards said first location, wherein said second specified speed of travel indicates that said user is moving slowly towards said first location and that the user will be within a second viewing range of said first location for a time period associated with enough time to receive an entire description for said first location;
   determining, by said tracking apparatus based on second orientation data supplied by said digital compass, a second direction of said tracking apparatus with respect to said first location; and
   broadcasting, by said tracking apparatus, a second specified portion of said first audio/video data segment, said second specified portion dependent on second specified distance, said additional amount of time, said second specified speed of travel, and said second direction, said specified portion differing from said second specified portion, said second specified portion comprising an entire portion of said first audio/video data segment consistent with said second viewing range.

2. The method of claim 1, wherein said tracking apparatus comprises a global positioning satellite (GPS) receiver, wherein said first associated tracking data segment comprises a first GPS data segment associated with said specified condition, wherein said sensing comprises retrieving a GPS location for said first location, and wherein said method further comprises:
   matching, by said tracking apparatus, said first GPS data segment with said specified condition.

3. The method of claim 2, further comprising:
   pivoting, said tracking apparatus towards a second location;
   retrieving, by said tracking apparatus, a second audio/video data segment of said audio/video data segments associated with said second location, said retrieving said second audio/video data segment based on orientation data supplied by said digital compass and said GPS location; and
   broadcasting, by said tracking apparatus, a specified portion of said second audio/video data segment.

4. The method of claim 1, wherein said tracking apparatus comprises a radio frequency identification (RFID) tag reader, wherein said first location comprises a first structure, wherein said first structure comprises a first RFID tag, wherein said first tracking data segment comprises information related to said RFID tag, and wherein said method further comprises:
    matching, by said tracking apparatus, said information with said first RFID tag.

5. The method of claim 4, wherein said information comprises a serial number for said first RFID tag.

6. The method of claim 1, wherein said tracking apparatus comprises a removable memory unit, and wherein said data is stored on said removable memory unit.

7. The method of claim 6, wherein said removable memory unit is selected from the group consisting of a read only memory (ROM) unit and a flash memory unit.

8. The method of claim 1, wherein said first audio/video data segment comprises information describing said first location.

9. The method of claim 1, wherein said specified portion of said first audio/video data segment does not comprise an entire portion of said first audio/video data segment.

10. A tracking apparatus comprising a processor coupled to a removable computer-readable memory unit and a digital compass, said memory unit comprising data and instructions that when executed by the processor implement a tracking method, said data comprising audio/video data segments with associated tracking data segments, said audio/video data segments and said associated tracking data segments associated with a plurality of locations, each audio/video data segment of said audio/video data segments and each associated tracking data segment of said tracking data segments associated with a different location from said plurality of locations, each said location at a different geographical area, said method comprising:
    receiving, by said tracking apparatus, said data;
    receiving, by said tracking apparatus, a plurality of preprogrammed specified distances from a first location of said locations;
    receiving, by said tracking apparatus, a plurality of preprogrammed specified time periods associated with said first location of said locations;
    storing, by said tracking apparatus within said removable computer-readable memory unit attached to said tracking apparatus, said data, said plurality of preprogrammed specified distances, and said plurality of preprogrammed specified time periods;
    moving said tracking apparatus within a specified proximity of said first location of said locations;
    sensing, by said tracking apparatus, said first location of said locations;
    retrieving, by said tracking apparatus, a first audio/video data segment of said audio/video data segments describing said first location, said retrieving based on a first tracking data segment of said associated tracking data segments associated with said first audio/video data segment;
    determining, by said tracking apparatus based on said plurality of preprogrammed specified distances and a signal strength received from a device at said first location, a specified distance that said tracking apparatus is from first location;
    determining, by said tracking apparatus based on said plurality of preprogrammed specified time periods, an amount of time that said tracking apparatus has been located within said specified proximity of said first location;
    determining, by said tracking apparatus, a specified speed of travel of said tracking apparatus towards said first location, wherein said specified speed of travel indicates that a user of said tracking apparatus is moving quickly towards said first location and that the user may not be within a first viewing range of the first location for a long time period;
    determining, by said tracking apparatus based on first orientation data supplied by said digital compass, a direction of said tracking apparatus with respect to said first location; and
    broadcasting, by said tracking apparatus, a specified portion of said first audio/video data segment, said specified portion dependent on said specified distance, said amount of time, said specified speed of travel, and said direction, said specified portion comprising a small abbreviated portion of said first audio/video data segment consistent with said first viewing range;
    determining, by said tracking apparatus based on said plurality of preprogrammed specified distances and a second signal strength received from a device at said first location, a second specified distance that said tracking apparatus is from first location;
    determining, by said tracking apparatus based on said plurality of preprogrammed specified time periods, an additional amount of time that said tracking apparatus has been located within said specified proximity of said first location;
    determining, by said tracking apparatus, a second specified speed of travel of said tracking apparatus towards said first location, wherein said second specified speed of travel indicates that said user is moving slowly towards said first location and that the user will be within a second viewing range of said first location for a time period associated with enough time to receive an entire description for said first location;
    determining, by said tracking apparatus based on second orientation data supplied by said digital compass, a second direction of said tracking apparatus with respect to said first location; and
    broadcasting, by said tracking apparatus, a second specified portion of said first audio/video data segment, said second specified portion dependent on second specified distance, said additional amount of time, said second specified speed of travel, and said second direction, said specified portion differing from said second specified portion, said second specified portion comprising an entire portion of said first audio/video data segment consistent with said second viewing range.

11. The apparatus of claim 10, wherein said tracking apparatus comprises a global positioning satellite (GPS) receiver, wherein said first associated tracking data segment comprises a first GPS data segment associated with said specified condition, wherein said sensing comprises retrieving a GPS location for said first location, and wherein said method further comprises:
    matching, by said tracking apparatus, said first GPS data segment with said specified condition.

12. The apparatus of claim 11, further comprising a digital compass, and wherein said method further comprises:
    pivoting, said tracking apparatus towards a second location;
    retrieving, by said tracking apparatus, a second audio/video data segment of said audio/video data segments associated with said second location, said retrieving said second audio/video data segment based on orientation data supplied by said digital compass and said GPS location; and broadcasting, by said tracking apparatus, a specified portion of said second audio/video data segment.

13. The apparatus of claim 10, wherein said tracking apparatus comprises a radio frequency identification (RFID) tag reader, wherein said first location comprises a first structure, wherein said first structure comprises a first RFID tag, wherein said first tracking data segment comprises information related to said RFID tag, and wherein said method further comprises:
   matching, by said tracking apparatus, said information with said first RFID tag.

14. The apparatus of claim 13, wherein said information comprises a serial number for said first RFID tag.

15. The apparatus of claim 10, wherein said memory unit comprises a removable memory unit, and wherein said data is stored on said removable memory unit.

16. The apparatus of claim 15, wherein said removable memory unit is selected from the group consisting of a read only memory (ROM) unit and a flash memory unit.

17. The apparatus of claim 10, wherein said first audio/video data segment comprises information describing said first location.

18. The apparatus of claim 10, wherein said specified portion of said first audio/video data segment does not comprise an entire portion of said first audio/video data segment.

19. A computer program product, comprising a computer readable memory device comprising data and a computer readable program code embodied therein, said data comprising audio/video data segments with associated tracking data segments, said audio/video data segments and said associated tracking data segments associated with a plurality of locations, each audio/video data segment of said audio/video data segments and each associated tracking data segment of said tracking data segments associated with a different location from said plurality of locations, each said location at a different geographical area, said computer readable program code comprising an algorithm adapted to implement a tracking method within a tracking apparatus comprising removable memory device and a digital compass, said method comprising:
   receiving, by said tracking apparatus, data;
   receiving, by said tracking apparatus, a plurality of preprogrammed specified distances from a first location of said locations;
   receiving, by said tracking apparatus, a plurality of preprogrammed specified time periods associated with said first location of said locations;
   storing, by said tracking apparatus within said removable memory device attached to said tracking apparatus, said data, said plurality of preprogrammed specified distances, and said plurality of preprogrammed specified time periods;
   moving said tracking apparatus within a specified proximity of said first location of said locations;
   sensing, by said tracking apparatus, said first location of said locations;
   retrieving, by said tracking apparatus, a first audio/video data segment of said audio/video data segments describing said first location, said retrieving based on a first tracking data segment of said associated tracking data segments associated with said first audio/video data segment;
   determining, by said tracking apparatus based on said plurality of preprogrammed specified distances and a signal strength received from a device at said first location, a specified distance that said tracking apparatus is from first location;
   determining, by said tracking apparatus based on said plurality of preprogrammed specified time periods, an amount of time that said tracking apparatus has been located within said specified proximity of said first location;
   determining, by said tracking apparatus, a specified speed of travel of said tracking apparatus towards said first location, wherein said specified speed of travel indicates that a user of said tracking apparatus is moving quickly towards said first location and that the user may not be within a first viewing range of the first location for a long time period;
   determining, by said tracking apparatus based on first orientation data supplied by said digital compass, a direction of said tracking apparatus with respect to said first location; and
   broadcasting, by said tracking apparatus, a specified portion of said first audio/video data segment, said specified portion dependent on said specified distance, said amount of time, said specified speed of travel, and said direction, said specified portion comprising a small abbreviated portion of said first audio/video data segment consistent with said first viewing range;
   determining, by said tracking apparatus based on said plurality of preprogrammed specified distances and a second signal strength received from a device at said first location, a second specified distance that said tracking apparatus is from first location;
   determining, by said tracking apparatus based on said plurality of preprogrammed specified time periods, an additional amount of time that said tracking apparatus has been located within said specified proximity of said first location:
   determining, by said tracking apparatus, a second specified speed of travel of said tracking apparatus towards said first location, wherein said second specified speed of travel indicates that said user is moving slowly towards said first location and that the user will be within a second viewing range of said first location for a time period associated with enough time to receive an entire description for said first location;
   determining, by said tracking apparatus based on second orientation data supplied by said digital compass, a second direction of said tracking apparatus with respect to said first location; and
   broadcasting, by said tracking apparatus, a second specified portion of said first audio/video data segment, said second specified portion dependent on second specified distance, said additional amount of time, said second specified speed of travel, and said second direction, said specified portion differing from said second specified portion, said second specified portion comprising an entire portion of said first audio/video data segment consistent with said second viewing range.

20. The computer program product of claim 19, wherein said tracking apparatus comprises a global positioning satellite (GPS) receiver, wherein said first associated tracking data segment comprises a first GPS data segment associated with said specified condition, wherein said sensing comprises retrieving a GPS location for said first location, and wherein said method further comprises:
   matching, by said tracking apparatus, said first GPS data segment with said specified condition.

21. The computer program product of claim 20, wherein said method further comprises:
   pivoting, said tracking apparatus towards a second location;

retrieving, by said tracking apparatus, a second audio/video data segment of said audio/video data segments associated with said second location, said retrieving said second audio/video data segment based on orientation data supplied by said digital compass and said GPS location; and broadcasting, by said tracking apparatus, a specified portion of said second audio/video data segment.

22. The computer program product of claim 19, wherein said tracking apparatus comprises a radio frequency identification (RFID) tag reader, wherein said first location comprises a first structure, wherein said first structure comprises a first RFID tag, wherein said first tracking data segment comprises information related to said RFID tag, and wherein said method further comprises:

matching, by said tracking apparatus, said information with said first RFID tag.

23. The computer program product of claim 22, wherein said information comprises a serial number for said first RFID tag.

24. The computer program product of claim 19, wherein said computer usable medium comprises a removable computer usable medium, and wherein said data is stored on said removable computer usable medium.

25. The computer program product of claim 24, wherein said removable computer usable medium is selected from the group consisting of a read only memory (ROM) unit and a flash memory unit.

26. The computer program product of claim 19, wherein said first audio/video data segment comprises information describing said first location.

27. The computer program product of claim 19, wherein said specified portion of said first audio/video data segment does not comprise an entire portion of said first audio/video data segment.

* * * * *